(12) United States Patent
Nguyen et al.

(10) Patent No.: US 12,101,028 B2
(45) Date of Patent: Sep. 24, 2024

(54) DC-DC CONVERTER CIRCUIT FOR MITIGATING INSTABILITY OF AN OUTPUT VOLTAGE

(71) Applicant: ACTIVE-SEMI (SHANGHAI) CO., LTD., Shanghai (CN)

(72) Inventors: Thinh Ba Nguyen, Hanoi (VN); Hue Khac Trinh, Hanoi (VN)

(73) Assignee: Active-Semi (Shanghai) Co., Ltd., Shanghai (CN)

( * ) Notice: Subject to any disclaimer, the term of this patent is extended or adjusted under 35 U.S.C. 154(b) by 175 days.

(21) Appl. No.: 17/628,209

(22) PCT Filed: Jul. 17, 2020

(86) PCT No.: PCT/CN2020/102856
§ 371 (c)(1),
(2) Date: Jan. 18, 2022

(87) PCT Pub. No.: WO2021/013108
PCT Pub. Date: Jan. 28, 2021

(65) Prior Publication Data
US 2022/0255431 A1   Aug. 11, 2022

(30) Foreign Application Priority Data

Jul. 19, 2019 (VN) .............................. 1-2019-03926

(51) Int. Cl.
*H02M 3/158*   (2006.01)
*H02M 1/00*   (2006.01)

(52) U.S. Cl.
CPC ......... *H02M 3/158* (2013.01); *H02M 1/0025* (2021.05)

(58) Field of Classification Search
CPC ............ H02M 3/00; H02M 3/02; H02M 3/04; H02M 3/10; H02M 3/135; H02M 3/137;
(Continued)

(56) References Cited

U.S. PATENT DOCUMENTS 9,201,438 B2 * 12/2015 MacLean .................. G05F 1/62
9,281,745 B2    3/2016 Zoso et al.
(Continued)

FOREIGN PATENT DOCUMENTS

CN   101807852 A   8/2010
CN   102412724 A   4/2012
(Continued)

OTHER PUBLICATIONS

Richtek, "Compensation Design for Peak Current-Mode Buck Converters," Application Note AN028, Apr. 2014, Richtek Technology Corporation, https://www.richtek.com/Design%20Support/Technical%20Document/AN028, 13 page.
(Continued)

*Primary Examiner* — Thienvu V Tran
*Assistant Examiner* — Carlos O Rivera-Perez
(74) *Attorney, Agent, or Firm* — Withrow & Terranova, P.L.L.C.

(57) ABSTRACT

A direct-current to direct-current (DC-DC) converter circuit is provided. The DC-DC converter circuit is capable of generating a DC output voltage in a defined voltage range based on an input voltage. The DC-DC converter circuit can include a modulator circuit, an output filter circuit, and a compensator circuit. In a non-limiting example, the output filter circuit includes an inductor-capacitor (LC) circuit formed by an inductor and a multi-layer ceramic capacitor (MLCC). Notably, the MLCC can produce a variable capacitance in the defined voltage range due to inherent DC bias instability, thus risking stability of the DC-DC converter circuit. As such, a control circuit is configured to determine a configurable transconductance based on feedback of the output voltage and control the compensator circuit to operate accordingly. As such, it may be possible to mitigate the (Continued)

effect of MLCC capacitance variation, thus helping to maintain stability of the DC-DC converter circuit.

20 Claims, 4 Drawing Sheets

(58) Field of Classification Search
CPC ...... H02M 3/139; H02M 3/142; H02M 3/145; H02M 3/155; H02M 3/1552; H02M 3/156; H02M 3/1566; H02M 3/157; H02M 3/158; H02M 3/1582; H02M 3/1588; H02M 1/0003; H02M 1/0012; H02M 1/0016; H02M 1/0019; H02M 1/0025; H02M 1/14; H02M 1/143; H02M 1/44; G05F 1/46; G05F 1/462; G05F 1/62
USPC ........ 323/222–226, 266, 269–275, 281–285, 323/288, 304, 311, 351
See application file for complete search history.

(56) References Cited

U.S. PATENT DOCUMENTS

| | | | | |
|---|---|---|---|---|
| 2011/0241632 A1* | 10/2011 | Yashiki | ................ | H02M 3/156 323/268 |
| 2012/0098512 A1 | 4/2012 | Kirchner | | |
| 2014/0002043 A1* | 1/2014 | Li | ................ | H02M 3/156 323/282 |
| 2014/0132232 A1 | 5/2014 | MacLean et al. | | |

FOREIGN PATENT DOCUMENTS

| | | |
|---|---|---|
| CN | 103513685 A | 1/2014 |
| CN | 108258900 A | 7/2018 |
| CN | 109478846 A | 3/2019 |
| JP | 2012110124 A | 6/2012 |

OTHER PUBLICATIONS

International Search Report and Written Opinion for International Patent Application No. PCT/CN2020/102856, mailed Oct. 28, 2020, 9 pages.
First Office Action for Chinese Patent Application No. 202080052435. 4, mailed Apr. 7, 2024, 21 pages.
Notice of Reasons for Rejection for Japanese Patent Application No. 2022530341, mailed Jun. 24, 2024, 9 pages.

* cited by examiner

DC-DC CONVERTER CIRCUIT FOR MITIGATING INSTABILITY OF AN OUTPUT VOLTAGE

This application is a 35 USC 371 national phase filing of International Application No. PCT/CN2020/102856, filed Jul. 17, 2020, which claims priority to Vietnamese Patent Application No. 1-2019-03926, filed Jul. 19, 2019, the disclosures of which are incorporated herein by reference in their entireties.

FIELD OF THE DISCLOSURE

The technology of the disclosure relates generally to a direct-current (DC) to DC (DC-DC) converter circuit.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

A mobile communication device is often powered by a battery configured to supply a battery direct-current (DC) voltage. Notably, the mobile communication device can include lower or higher-voltage components and/or circuits that are configured to operate at a lower or higher DC voltage(s) than the battery DC voltage. As such, the mobile communication device can include a DC-DC converter circuit(s) (e.g., a buck, boost, buck-boost regulator) to convert the battery DC voltage into the lower or higher DC voltage(s).

A DC-DC converter circuit typically includes an inductor-capacitor (LC) filter circuit configured to regulate the lower DC voltage(s) within a selected bandwidth. A multi-level ceramic capacitor (MLCC) is generally the capacitor of choice for the LC filter circuit thanks to many attractive features, such as lower equivalent serial resistance (ESR), better capacitance-to-volume ratio, relatively lower leakage, non-polarity, and lower cost of the MLCC. However, the MLCC may also have such disadvantages as smaller capacitance per volume and DC bias instability compared to other types of capacitors. In this regard, it may be desirable to employ the MLCC in the DC-DC converter circuit to capitalize on the attractive features, while mitigating the side effects of the MLCC.

SUMMARY

Aspects disclosed in the detailed description include a direct-current to direct-current (DC-DC) converter capable of generating a DC output voltage in a defined voltage range (e.g., 3V-24V) based on an input voltage. The DC-DC converter circuit can include a modulator circuit, an output filter circuit, and a compensator circuit. In a non-limiting example, the output filter circuit includes an inductor-capacitor (LC) circuit formed by an inductor and a multi-layer ceramic capacitor (MLCC). Notably, the MLCC can produce a variable capacitance in the defined voltage range due to inherent DC bias instability, thus risking stability of the DC-DC converter circuit. As such, a control circuit is provided to help maintain stability of the DC-DC converter circuit. Specifically, the control circuit is configured to determine a configurable transconductance based on feedback of the output voltage and control the compensator circuit to operate based on the determined configurable transconductance. As such, it may be possible to mitigate the effect of MLCC capacitance variation, thus helping to maintain stability of the DC-DC converter circuit.

In one aspect, a DC-DC converter circuit is provided. The DC-DC converter circuit includes a modulator circuit configured to generate a pulse train based on an input waveform and a control voltage. The DC-DC converter circuit also includes an output filter circuit coupled to the modulator circuit and configured to generate an output voltage in a defined voltage range based on an input voltage and the pulse train. The DC-DC converter circuit also includes a compensator circuit having a configurable transconductance and configured to generate and provide the control voltage to the modulator circuit. The DC-DC converter circuit also includes a control circuit coupled to the output filter circuit and the compensator circuit. The control circuit is configured to receive feedback of the output voltage from the output filter circuit. The control circuit is also configured to determine the configurable transconductance based on the feedback of the output voltage. The control circuit is also configured to configure the compensator circuit to generate the control voltage based on the determined configurable transconductance.

In another aspect, a DC-DC converter circuit is provided. The DC-DC converter circuit includes a modulator circuit configured to generate a pulse train based on an input waveform and a control voltage. The DC-DC converter circuit also includes an output filter circuit comprising an inductor-capacitor (LC) filter circuit formed based on an inductor and an MLCC. The output filter circuit is configured to generate an output voltage in a defined voltage range based on an input voltage and the pulse train. The DC-DC converter circuit also includes a compensator circuit having a configurable transconductance and configured to generate and provide the control voltage to the modulator circuit. The DC-DC converter circuit also includes a control circuit coupled to the output filter circuit and the compensator circuit. The control circuit is configured to receive a feedback of the output voltage from the output filter circuit. The control circuit is also configured to determine the configurable transconductance based on the feedback of the output voltage. The control circuit is also configured to configure the compensator circuit to generate the control voltage based on the determined configurable transconductance.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," arid "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a direct-current to direct-current (DC-DC) converter circuit. The DC-DC converter circuit is capable of generating a DC output voltage in a defined voltage range (e.g., 3V-24V) based on an input voltage. The DC-DC converter circuit can include a modulator circuit, an output filter circuit, and a compensator circuit. In a non-limiting example, the output filter circuit includes an inductor-capacitor (LC) circuit formed by an inductor and a multi-layer ceramic capacitor (MLCC). Notably, the MLCC can produce a variable capacitance in the defined voltage range due to inherent DC bias instability, thus risking stability of the DC-DC converter circuit. As such, a control circuit is provided to help maintain stability of the DC-DC converter circuit. Specifically, the control circuit is configured to determine a configurable transconductance base on feedback of the output voltage and control the compensator circuit to operate based on the determined configurable transconductance. As such, it may be possible to mitigate the effect of MLCC capacitance variation, thus helping to maintain stability of the DC-DC converter circuit.

Figure 1A:
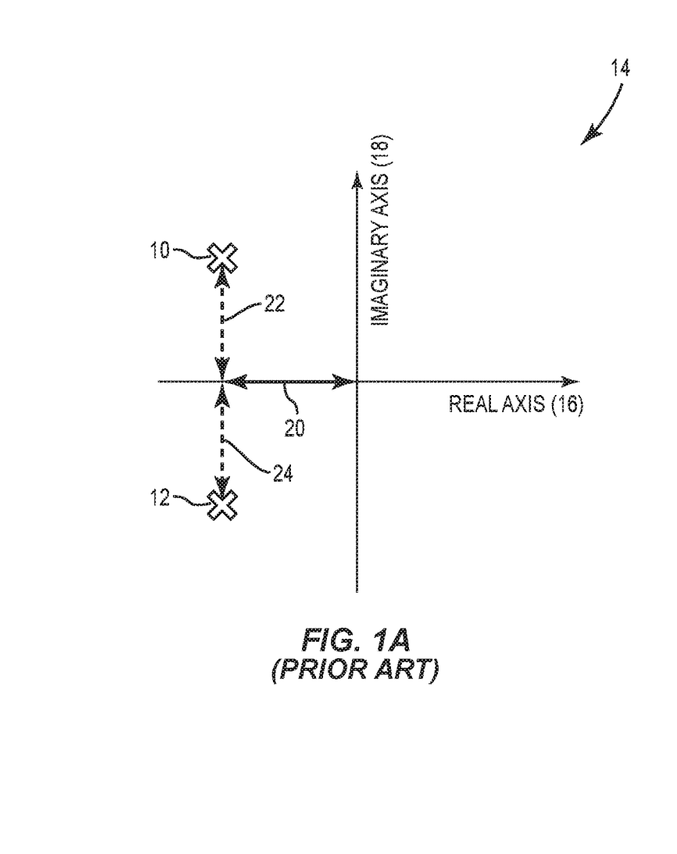
FIG. 1A is a graphic diagram providing an exemplary illustration of a pair of complex conjugate poles graphed in an s-plane.
Figure 1B:
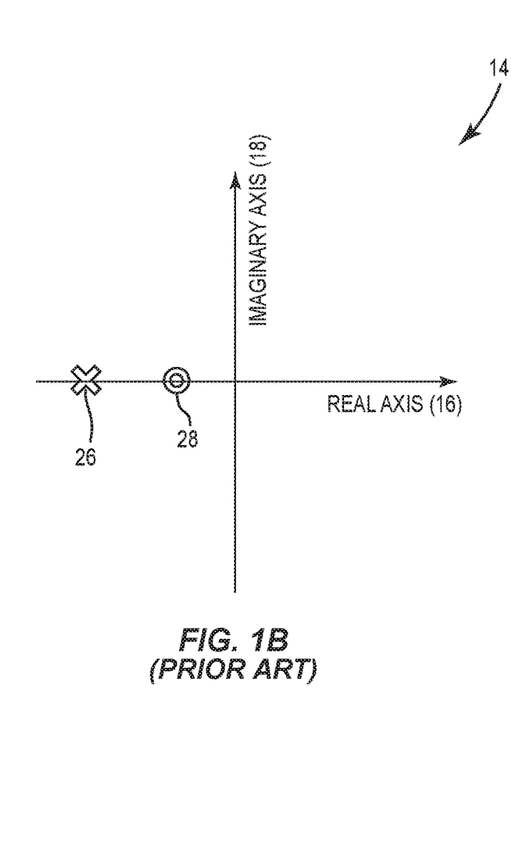
FIG. 1B is a graphic diagram providing an exemplary illustration of a real-pole and a real-zero as graphed in the s-plane of FIG. 1A.

Before discussing the DC-DC converter circuit of the present disclosure, a brief overview of transfer function is first provided with reference to FIGS. 1A and 1B to help define a high-order transfer function (e.g., second-order complex-pole transfer function) and a first-order real-pole/real-zero transfer function. An overview of an existing DC-DC converter circuit is then provided with reference to FIGS. 2A-2C to help establish an operational context for the DC-DC converter circuit of the present disclosure. The discussion of specific exemplary aspects of a DC-DC converter circuit of the present disclosure starts below with reference to FIG. 3.

A transfer function of a system, which is commonly denoted as H(s), can be expressed in the equation (Eq. 1) below.

$$H(s) = \frac{N(s)}{D(s)} \quad \text{(Eq. 1)}$$

In the equation (Eq. 1) above, N(s) and D(s) are simple polynomials that define a zero(s) and a pole(s) of the transfer function H(s), respectively. More specifically, the zero(s) is the root(s) of the polynomial N(s) and can be determined by solving the equation N(s)=0. In this regard, the order of the polynomial N(s) determines the number of zero(s) of the transfer function H(s). The zero(s) corresponds to a zero output(s) of the transfer function H(s). The polynomial N(s) is a zero-order polynomial when the polynomial N(s) represents a constant value and a first-order polynomial when the polynomial N(s) is equal to $1+b_0 s$.

In contrast, the pole(s) is the root(s) of the polynomial D(s) and can be determined by solving the equation D(s)=0. In this regard, the order of the polynomial D(s) determines the number of poles of the transfer function H(s). The pole(s) corresponds to an infinite output(s) of the transfer function H(s). The polynomial D(s) is a zero-order polynomial when the polynomial D(s) represents a constant value and a first-order polynomial when the polynomial is equal to $1+a_0 s$. The polynomial D(s) becomes a second-order polynomial when the polynomial D(s) is equal to $1+a_0 s+a_1 s^2$, a third-order polynomial when the polynomial D(s) is equal to $1+a_0 s+a_1 s^2+a_2 s^3$, and so on. In this regard, the polynomial D(s) is a high-order polynomial when the polynomial D(s) is not a zero-order or a first-order polynomial. Accordingly, the transfer function H(s) becomes a high-order transfer function H(s) when the polynomial D(s) is the high-order polynomial. More specifically, the transfer function H(s) is hereinafter referred to as a second-order complex-pole transfer function when the polynomial D(s) is the second-order polynomial and a complex-pole/real-pole transfer function when the polynomial D(s) is the third-order polynomial.

In one example, N(s) can be a zero-order polynomial and D(s) can be a second-order polynomial. Accordingly, the transfer function H(s) becomes a second-order transfer function having two poles. When the two poles are complex conjugate poles (e.g., damping factor<1), the transfer function H(s) is hereinafter referred to as a second-order complex-pole transfer function. In contrast, when the two poles are real poles (e.g., damping factor>1), the transfer function H(s) is hereinafter referred to as a second-order real-pole transfer function.

FIG. 1A is a graphic diagram providing an exemplary illustration of a pair of complex conjugate poles 10, 12 graphed in an s-plane 14. The s-plane 14 is a complex plane for graphing Pierre-Simon Laplace (Laplace) transforms. The s-plane 14 includes a real axis 16 and an imaginary axis 18 perpendicular to the real axis 16. The complex conjugate poles 10, 12, as graphed in the s-plane 14, have real parts 20 that are equal in magnitude and sign. The complex conjugate poles 10, 12 have imaginary parts 22, 24, respectively. The imaginary parts 22, 24 are equal in magnitude, but opposing in sign.

In another example, N(s) and D(s) are both first order polynomials. Accordingly, the transfer function H(s) becomes a first-order transfer function with one pole and one zero. FIG. 1B is a graphic diagram providing an exemplary illustration of a real-pole 26 and a real-zero 28 as graphed in the s-plane 14 of FIG. 1A.

The real-pole 26 and the real-zero 28 are both located on the real axis 16. Although the real-pole 26 as shown is farther apart from the imaginary axis 18 than the real-zero 28, it is also possible for the real-pole 26 to be closer to the imaginary axis 18 than the real-zero 28. With the real-pole 26 and the real-zero 28 both located on the real axis 16, the transfer function H(s) is hereinafter referred to as a first-order real-pole/real-zero transfer function.

In another example, N(s) can be a first-order polynomial with real-pole/real-zero and D(s) can be a third-order polynomial with two complex poles and a real-pole. In this regard, the transfer function H(s) can be referred to as a "second-order complex-pole in series with a first-order real-pole/real-zero" transfer function.

Figure 2A:
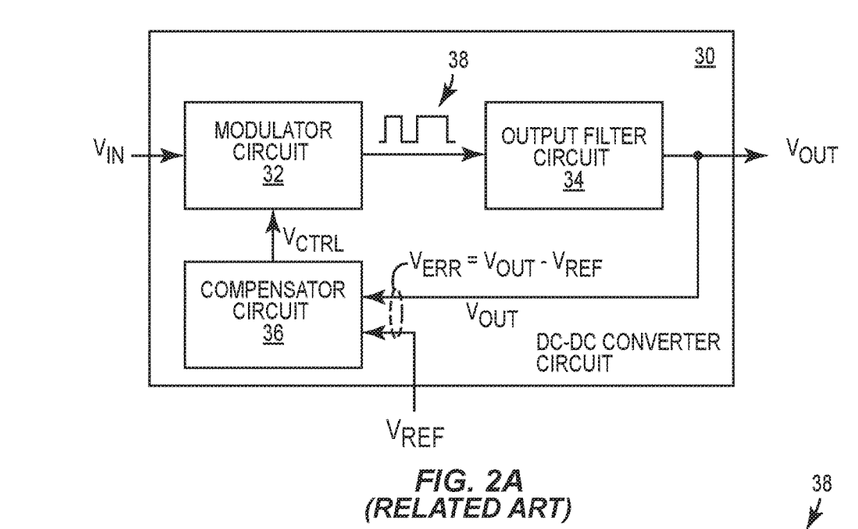
FIG. 2A is a schematic diagram of an existing direct-current to direct-current (DC-DC) converter circuit configured to generate an output voltage based on an input voltage.

FIG. 2A is a schematic diagram of an existing DC-DC converter circuit 30 configured to generate an output voltage $V_{OUT}$ based on an input voltage $V_{IN}$. The existing DC-DC converter circuit 30 includes a modulator circuit 32, an output filter circuit 34, and a compensator circuit 36. The output filter circuit 34 is coupled in series to the modulator circuit 32. The compensator circuit 36 is coupled between the modulator circuit 32 and the output filter circuit 34 to form a closed loop. The modulator circuit 32 is configured to generate a pulse train 38 having amplitude in between zero voltage (0V) and the input voltage $V_{IN}$. In this regard, the pulse train 38 alternates between 0V and the input voltage $V_{IN}$ in accordance with a duty cycle, which equals a total time the pulse train 38 stays at the input voltage $V_{IN}$ during a defined period divided by a duration of the defined period. In this regard, a respective pulse width of each pulse in the pulse train 38 increases when the duty cycle increases and decreases when the duty cycle decreases.

The output filter circuit 34 is configured to generate the output voltage $V_{OUT}$. The compensator circuit 36 is configured to receive feedback of the output voltage $V_{OUT}$ and a reference voltage $V_{REF}$, which represents a target of the output voltage $V_{OUT}$. The compensator circuit 36 compares the feedback of the output voltage $V_{OUT}$ with the reference voltage $V_{REF}$ to determine whether a voltage error $V_{ERR}$ exists between the feedback of the output voltage $V_{OUT}$ and the reference voltage $V_{REF}$ ($V_{ERR}=V_{OUT}-V_{REF}$). If the voltage error $V_{ERR}$ is not equal to zero, the compensator circuit 36 may provide a control voltage $V_{CTRL}$ to the modulator circuit 32. In a non-limiting example, the control voltage $V_{CTRL}$ may cause the duty cycle of the pulse train 38 to change and, consequently, cause a change in the output voltage $V_{OUT}$ to equalize the output voltage $V_{OUT}$ and the reference voltage $V_{REF}$.

Figure 2B:
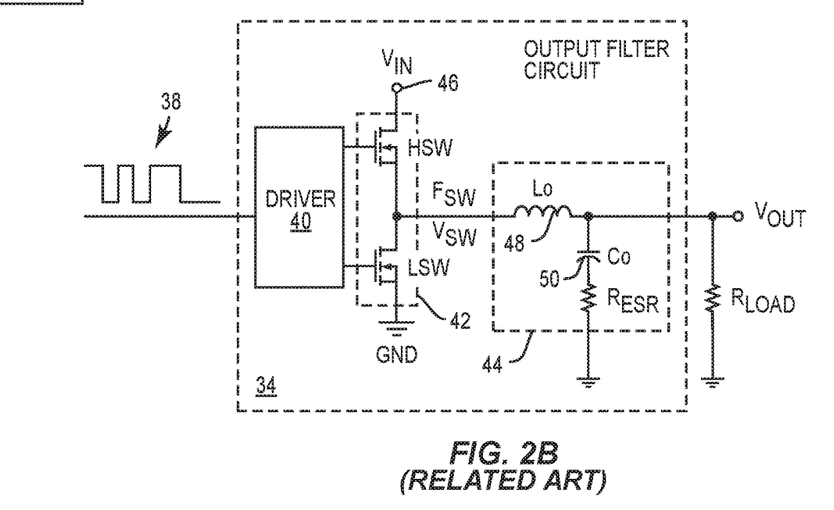
FIG. 2B is a schematic diagram providing an exemplary illustration of an output filter circuit in the existing DC-DC converter circuit of FIG. 2A.

The output filter circuit 34 is configured perform an averaging function to convert the pulse train 38 into the output voltage $V_{OUT}$. FIG. 2B is a schematic diagram providing an exemplary illustration of the output filter circuit 34 in the existing DC-DC converter circuit 30 of FIG. 2A. Common elements between FIGS. 2A and 2B are shown therein with common element numbers and will not be re-described herein.

The output filter circuit 34 may include a driver-stage circuit 40 (denoted as "DRIVER"), a power-stage switch circuit 42, and an LC filter circuit 44. The power-stage switch circuit 42 includes a high-side switch HSW and a low-side switch LSW coupled in series between a node 46 configured to receive the input voltage $V_{IN}$ and a ground GND. The driver-stage circuit 40 is configured to receive the pulse train 38 and control the power-stage switch circuit 42 based on the duty cycle of the pulse train 38 to couple the input voltage $V_{IN}$ to the LC filter circuit 44 or decouple the input voltage $V_{IN}$ from the LC filter circuit 44. In this regard, the duty cycle of the pulse train 38 causes the power-stage switch circuit 42 to operate based on a switching frequency $F_{SW}$.

The LC filter circuit 44 includes an inductor 48 having an inductance $L_0$ and an MLCC 50 having a capacitance $C_0$. Notably, the MLCC 50 can have an inherent equivalent serial resistance $R_{ESR}$. The LC filter circuit 44 may be coupled to a load circuit (e.g., a circuit receiving the output voltage $V_{OUT}$) represented by a load resistance $R_{LOAD}$.

When the driver-stage circuit 40 drives the power-stage switch circuit 42 to close the HSW and open the LSW, the inductor 48 is coupled to the node 46 to receive a bias voltage $V_{SW}$ that may be slightly below the input voltage $V_{IN}$ ($V_{SW}=V_{IN}$ minus the drop voltage of the HSW). Accordingly, the bias voltage $V_{SW}$ causes a current to flow from the node 46 through the inductor 48 to charge the MLCC 50 to the output voltage $V_{OUT}$. In contrast, when the driver-stage circuit 40 drives the power-stage switch circuit 42 to open the HSW and close the LSW, the inductor 48 is coupled to the ground GND. Accordingly, the MLCC 50 is discharged and a current will flow from the MLCC 50 to the ground GND through the inductor 48. As a result, the LC filter circuit 44 resonates at a resonance frequency $f_0$, as shown in equation (Eq. 2) below.

$$f_0 = \frac{1}{2\pi\sqrt{L_0 C_0}} \quad \text{(Eq. 2)}$$

Figure 2C:
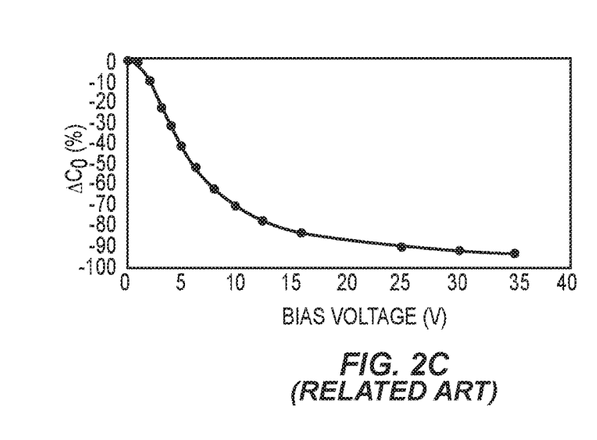
FIG. 2C is a graphic diagram providing an exemplary illustration of capacitance variation of a multi-layer ceramic capacitor (MLCC) as a function of a bias voltage.

In this regard, the LC filter circuit 44 represents a double pole transfer function and operates as a low pass filter in a frequency domain to pass the output voltage $V_{OUT}$. As previously mentioned, one of the shortcomings of the MLCC 50 is DC bias instability, which means that the capacitance $C_0$ can vary when the bias voltage $V_{SW}$ varies. FIG. 2C is a graphic diagram providing an exemplary illustration of capacitance variation of the MLCC 50 in FIG. 2B as a function of the bias voltage $V_{SW}$. As shown in FIG. 2C, the capacitance $C_0$ of the MLCC 50 decreases when the bias voltage $V_{SW}$ increases. In contrast, the capacitance $C_0$ of the MLCC 50 increases when the bias voltage $V_{SW}$ increases.

According to the equation (Eq. 2) above, the resonance frequency $f_0$ may be affected when the capacitance $C_0$ of the MLCC 50 varies. As a result, the double pole of the LC filter circuit 44 may shift rightward toward or even cross the imaginary axis 18 in FIGS. 1A and 1B, thus risking destabilizing the existing DC-DC converter circuit 30. Although it may be possible to replace the MLCC 50 with another type of capacitor with lesser DC bias instability, it would unfortunately mean forgoing the many attractive features of the MLCC 50. As such, it may be desirable to employ the MLCC 50 in the LC filter circuit 44 while mitigating an effect of DC bias instability resulting from the MLCC 50.

Figure 3A:
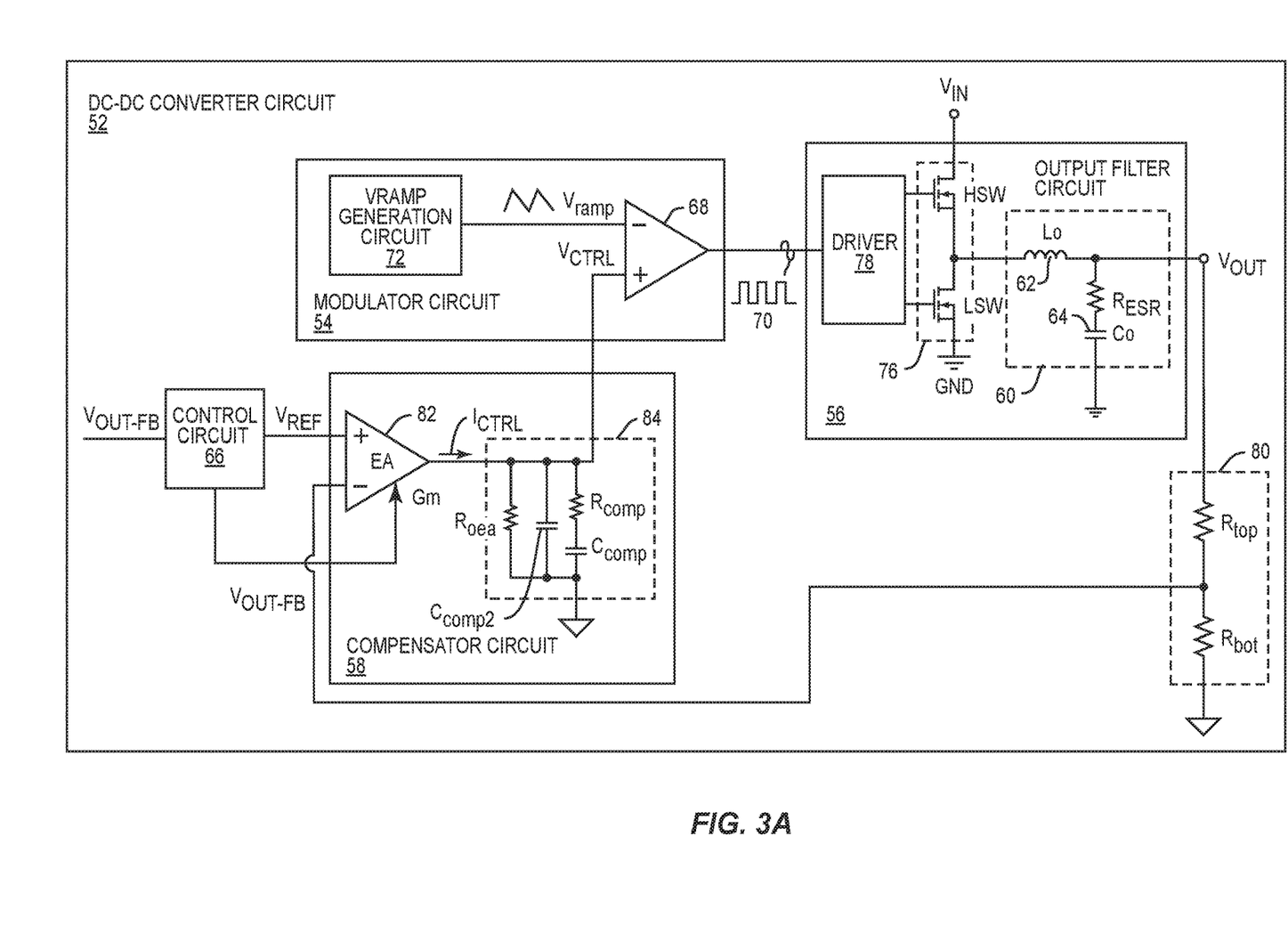
FIG. 3A is a schematic diagram of an exemplary DC-DC converter circuit, such as a buck regulator circuit, configured according to an embodiment of the present disclosure to overcome an instability issue associated with the existing DC-DC converter circuit of FIG. 2A.

In this regard, FIG. 3A is a schematic diagram of an exemplary DC-DC converter circuit 52 configured according to an embodiment of the present disclosure to overcome the instability issue as discussed above in the existing DC-DC converter circuit 30 of FIG. 2A. In examples discussed hereinafter, the DC-DC converter circuit 52 can be a buck regulator circuit. Notably, the DC-DC converter circuit 52 can also be a DC-DC boost regulator circuit or a DC-DC buck-boost circuit. It should also be appreciated that the operational principles discussed hereinafter can be applied to other types of DC-DC converters as well. The DC-DC converter circuit 52 may be similar to the existing DC-DC converter circuit 30 in that the DC-DC converter circuit 52 also includes a modulator circuit 54, an output filter circuit 56, and a compensator circuit 58. Also, the output filter circuit 56 includes an LC filter circuit 60 that is formed by an inductor 62 having an inductance $L_0$ and an MLCC 64 having a capacitance $C_0$. However, the DC-DC converter circuit 52 differs from the existing DC-DC converter circuit 30 in that the DC-DC converter circuit 52 further includes a control circuit 66. As discussed in detail below, the control circuit 66 may be configured to control the compensator circuit 58 to help mitigate the instability issue in the existing DC-DC converter circuit 30 as discussed above in FIGS. 2A-2C. By including the control circuit 66 in the DC-DC converter circuit 52 to mitigate the instability issue, it may be possible to realize the many attractive features of the MLCC 64, thus helping to reduce cost and footprint of the DC-DC converter circuit 52.

Figure 3B:
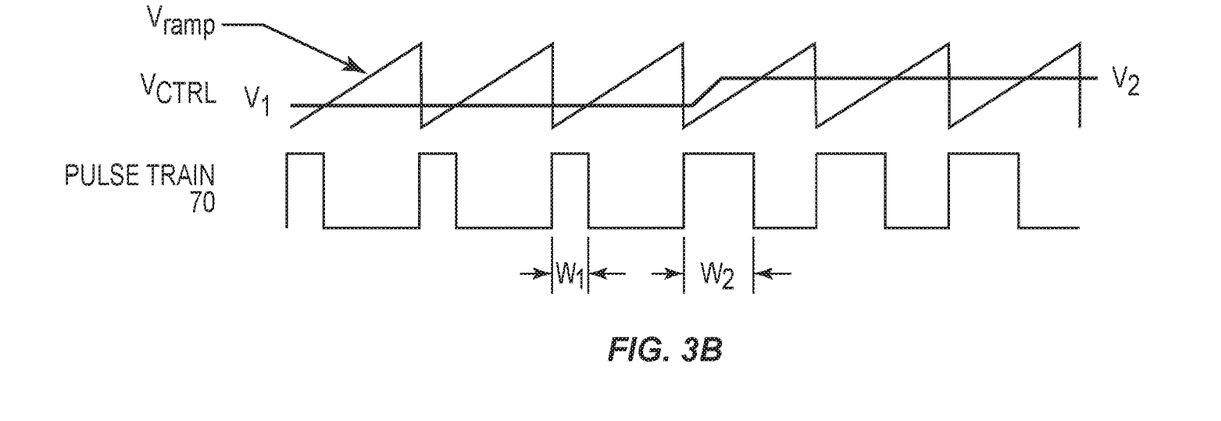
FIG. 3B is a graphic diagram providing an exemplary illustration of an input waveform, a control voltage, and a pulse train associated with a modulator circuit in the DC-DC converter circuit of FIG. 3A.

The modulator circuit 54 includes a voltage comparator 68 configured to generate a pulse train 70 based on an input waveform $V_{ramp}$ and a control voltage $V_{CTRL}$. As illustrated in FIG. 3B, the control voltage $V_{CTRL}$ can cause a duty cycle of the pulse train 70 to change.

In this regard, FIG. 3B is a graphic diagram providing an exemplary illustration of the input waveform $V_{ramp}$, the control voltage $V_{CTRL}$, and the pulse train 70. As shown in FIG. 3B, when the control voltage $V_{CTRL}$ increases from $V_1$ to $V_2$, the pulse train 70 changes from a narrower pulse width $W_1$ to a wider pulse width $W_2$. As such, the pulse train 70 will transition from a lower duty cycle to a higher duty cycle.

Figure 3C:
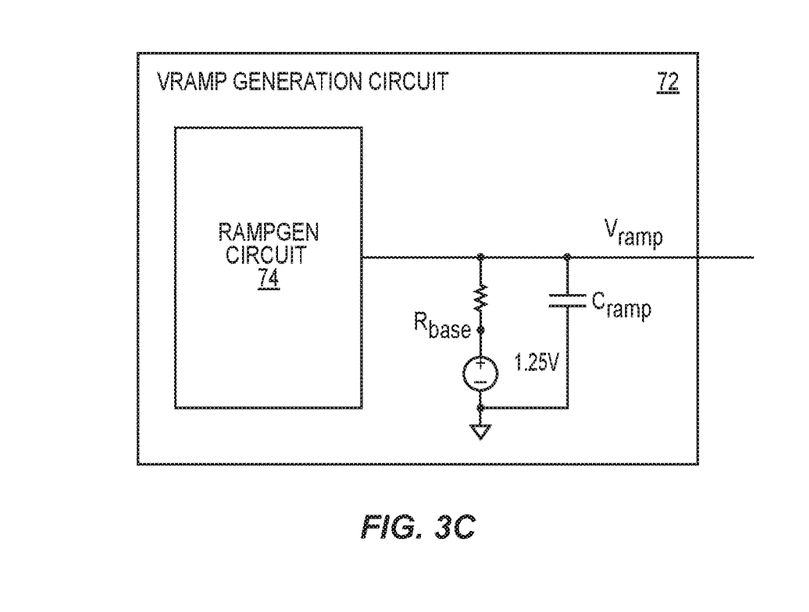
FIG. 3C is a schematic diagram providing an exemplary illustration of a VRAMP generation circuit in the DC-DC converter circuit of FIG. 3A configured to generate the input waveform in FIG. 3B.

With reference to FIG. 3A, the modulator circuit 54 may include a VRAMP generation circuit 72 configured to generate the input waveform $V_{ramp}$. FIG. 3C is a schematic diagram providing an exemplary illustration of the VRAMP generation circuit 72 in the DC-DC converter circuit 52 of FIG. 3A configured to generate the input waveform $V_{ramp}$.

In a non-limiting example, the VRAMP generation circuit 72 includes a RAMPGEN circuit 74, a resistor $R_{base}$, and a capacitor $C_{ramp}$. As discussed later, the resistor $R_{base}$ and the capacitor $C_{ramp}$ are among the many parameters that define a transfer function H(s) of the DC-DC converter circuit 52.

With reference back to FIG. 3A, the output filter circuit 56 includes a power-stage switch circuit 76 and a driver-stage circuit 78 (denoted as "DRIVER"). The output filter circuit 56 is configured to generate an output voltage $V_{OUT}$ in a defined voltage range (e.g., ≥3 V and ≤24 V) based on an input voltage $V_{IN}$ and the pulse train 70. The power-stage switch circuit 76 and the driver-stage circuit 78 are functionally equivalent to the driver-stage circuit 40 and the power-stage switch circuit 42 in the existing DC-DC converter circuit 30, respectively.

The output filter circuit 56 may be coupled to a voltage divider 80 configured to generate a feedback of the output voltage $V_{OUT}$ (hereinafter referred to as "$V_{OUT-FB}$"). The voltage divider 80 may include a top resistor $R_{top}$ and a bottom resistor $R_{bot}$ configured to divide the output voltage $V_{OUT}$ to generate the $V_{OUT-FB}$ ($V_{OUT-FB}=V_{OUT}*R_{bot}/(R_{top}+R_{bot})$).

The compensator circuit 58 includes an error amplifier 82 (denoted as "EA") and a circuit 84. The error amplifier 82 is configured to receive a reference voltage $V_{REF}$, which may represent a scaled target of the output voltage $V_{OUT}$, and the $V_{OUT-FB}$. In a non-limiting example, the error amplifier 82 is a transconductance amplifier having a configurable transconductance $G_m$. In this regard, the error amplifier 82 generates a control current $I_{CTRL}$ based on the reference voltage $V_{REF}$ and the $V_{OUT-FB}$ ($I_{CTRL}=G_m*(V_{OUT-FB}-V_{REF})$).

The circuit 84 may include a resistor $R_{oea}$ coupled in parallel to a capacitor $C_{comp2}$. The circuit 84 may also include another resistor $R_{comp}$ coupled in series to another capacitor $C_{comp}$. The circuit 84 may be configured to generate the control voltage $V_{CTRL}$ based on the control current $I_{CTRL}$ and provide the control voltage $V_{CTRL}$ to the voltage comparator 68. According to the discussions earlier, the control voltage $V_{CTRL}$ may change the duty cycle of the pulse train 70 and thus the output voltage $V_{OUT}$.

In a non-limiting example, the transfer function H(s) of the DC-DC converter circuit 52 can be expressed in equation (Eq. 3)

$$H(s) = V_{OUT-FB} * (G_m * R_{oea}) * \frac{V_{IN} * R_{ramp}}{5 * R_{base}} * \frac{(1 + s * R_{comp} * C_{comp}) * (1 + s * R_{base} * C_{ramp}) * (1 + s * R_{ESR} * C_0)}{[1 + s * R_{oea} * (C_{comp} + C_{comp2})] * (1 + s * R_{comp} * C_{comp2}) * (1 + s^2 * L_0 * C_0)} \quad \text{(Eq. 3)}$$

By solving the equation (Eq. 3) as equaling one (1) at a cutoff frequency $F_C$, it is possible to express the cutoff frequency $F_C$ in equation (Eq. 4) below.

$$F_C = V_{OUT-FB} * G_m * \frac{V_{IN} * R_{comp} * R_{ramp} * C_{ramp}}{10 * \pi * L_0 * C_0} \quad \text{(Eq. 4)}$$

According to the equation (Eq. 4) above, the cutoff frequency $F_C$ is inversely related to the capacitance $C_0$ of the MLCC 64. As such, if the capacitance $C_0$ varies as a result of the inherent DC bias instability of the MLCC 64, the cutoff frequency $F_C$ may change accordingly, thus causing the DC-DC converter circuit 52 to become unstable. Thus, to maintain stability in the DC-DC converter circuit 52, it may be necessary to keep the cutoff frequency $F_C$ relatively stable, despite of variation of the capacitance $C_0$ of the MLCC 64.

Fortunately, the equation (Eq. 4) reveals that it may be possible to turn a number of knobs to help restore stability in the cutoff frequency $F_C$. For example, as the capacitance $C_0$ decreases as a result of increase of the bias voltage, it may be possible to increase the resistance $R_{comp}$, the resistance $R_{ramp}$, and/or the capacitance $C_{ramp}$ to help maintain the stability of the cutoff frequency $F_C$. However, it may be desirable to keep the resistance $R_{comp}$, the resistance $R_{ramp}$, and the capacitance $C_{ramp}$ fixed in the DC-DC converter circuit 52 for the sake of reduced complexity, cost, and/or footprint.

In this regard, in a preferred embodiment, the control circuit 66 is configured to adjust the configurable transconductance $G_m$ of the error amplifier 82 to help keep the cutoff frequency $F_C$ relatively stable in face of the variation of the capacitance $C_0$ of the MLCC 64. Specifically, the control circuit 66 may decrease the configurable transconductance $G_m$ when the capacitance $C_0$ of the MLCC 64 increases. In contrast, the control circuit 66 may increase the configurable transconductance $G_m$ when the capacitance $C_0$ of the MLCC 64 decreases.

In a non-limiting example, the control circuit 66 can include a look-up table (LUT), as shown below, configured to correlate a number of configurable transconductances with a number of predefined ranges of the output voltage $V_{OUT}$.

| Configurable Transconductance LUT | | |
|---|---|---|
| Binary Word | Range of $V_{OUT}$ | Transconductance |
| 00 | 3 V ≤ $V_{OUT}$ < 8 V | 1.00 $G_m$ |
| 01 | 8 V ≤ $V_{OUT}$ < 11.2 V | 0.75 $G_m$ |
| 10 | 11.2 V ≤ $V_{OUT}$ < 16 V | 0.50 $G_m$ |
| 11 | 16 V ≤ $V_{OUT}$ ≤ 24 V | 0.25 $G_m$ |

The control circuit 66 may receive a binary word representing the predefined range of the output voltage $V_{OUT}$. For example, a binary word "00" represents the range of the output voltage $V_{OUT}$ between 3 V and 8 V, a binary word "01" represents the range of the output voltage $V_{OUT}$ between 8 V and 11.2 V, a binary word "10" represents the range of the output voltage $V_{OUT}$ between 11.2 V and 16 V, and a binary word "11" represents the range of the output voltage $V_{OUT}$ between 16 V and 24 V. It should be appreciated that the binary word can include more digits to represent the range of the output voltage $V_{OUT}$ with more granularity.

Thus, based on the binary word, the control circuit 66 may retrieve a corresponding configurable transconductance $G_m$. Accordingly, the control circuit 66 may configure the error amplifier 82 to generate the control current $I_{CTRL}$ based on the determined configurable transconductance $G_m$. In addition, the control circuit may also be configured to provide the reference voltage $V_{REF}$ to the error amplifier 82.

Although it may be preferable to maintain stability of the DC-DC converter circuit 52 by adjusting only the configurable transconductance $G_m$ based on the $V_{OUT-FB}$, it should be appreciated that the DC-DC converter circuit 52 may also be configured to adjust the configurable transconductance $G_m$ in conjunction with adjusting the resistance $R_{comp}$, the resistance $R_{ramp}$, and/or the capacitance $C_{ramp}$. Further, as shown in the equation (Eq. 4) above, it may also be possible to adjust the cutoff frequency $F_C$ by adjusting the $V_{OUT-FB}$ and/or the inductance $L_0$, either in conjunction with or independent of adjusting the configurable transconductance $G_m$, the resistance $R_{comp}$, the resistance $R_{ramp}$, and/or the capacitance $C_{ramp}$.

Those skilled in the art will recognize improvements and modifications to the embodiments of the present disclosure. All such improvements and modifications are considered within the scope of the concepts disclosed herein and the claims that follow.

What is claimed is:
1. A direct-current to direct-current (DC-DC) converter circuit comprising:
 a modulator circuit configured to generate a pulse train based on an input waveform and a control voltage that sets a duty cycle of the pulse train;
 an output filter circuit coupled to the modulator circuit and configured to generate a bias voltage based on an input voltage and the duty cycle of the pulse train to cause a current to flow through a multi-layer ceramic capacitor (MLCC) to thereby generate an output voltage in a defined voltage range;
 a compensator circuit having a configurable transconductance and configured to:
  generate a control current as a function of the configurable transconductance; and
  generate the control voltage based on the control current and provide the control voltage to the modulator circuit to thereby set the duty cycle of the pulse train; and a control circuit coupled to the output filter circuit and the compensator circuit and configured to:
  receive an indication of the defined voltage range of the output voltage;
  determine the configurable transconductance based on the defined voltage range of the output voltage; and
  configure the compensator circuit to generate the control current based on the determined configurable transconductance to thereby reduce an instability of the output voltage caused by a capacitance fluctuation of the MLCC as a result of a variation of the bias voltage.

2. The DC-DC converter circuit of claim 1 wherein the control circuit is further configured to:
  decrease the configurable transconductance of the compensator circuit when the capacitance of the MLCC increases; and
  increase the configurable transconductance of the compensator circuit when the capacitance of the MLCC decreases.

3. The DC-DC converter circuit of claim 1 wherein the control circuit is further configured to retrieve the configurable transconductance from a look-up table (LUT) configured to correlate a plurality of configurable transconductances with a plurality of predefined ranges of the output voltage, respectively.

4. The DC-DC converter circuit of claim 3 wherein the control circuit is further configured to:
  receive a binary word a providing the indication of the predefined range of the output voltage among the plurality of predefined ranges of the output voltage; and
  retrieve the configurable transconductance corresponding to the predefined range of the output voltage represented by the binary word from the LUT.

5. The DC-DC converter circuit of claim 1 wherein the compensator circuit comprises:
  an error amplifier having the configurable transconductance and configured to generate the control current based on the indication of the predefined range of the output voltage and a reference voltage representing a scaled target of the output voltage; and
  a circuit configured to generate the control voltage based on the control current and provide the control voltage to the modulator circuit.

6. The DC-DC converter circuit of claim 5 wherein the control circuit is further configured to control the error amplifier to generate the control current based on the determined configurable transconductance.

7. The DC-DC converter circuit of claim 6 wherein the control circuit is further configured to:
  control the error amplifier to generate the control current based on a first transconductance when the output voltage is greater than or equal to 3V and less than 8V;
  control the error amplifier to generate the control current based on a second transconductance that is twenty-five percent (25%) lower than the first transconductance when the output voltage is greater than or equal to 8V and less than 11.2V;
  control the error amplifier to generate the control current based on a third transconductance that is 25% lower than the second transconductance when the output voltage is greater than or equal to 11.2V and less than 16V; and
  control the error amplifier to generate the control current based on a fourth transconductance that is 25% lower than the third transconductance when the output voltage is greater than or equal to 16V and less than or equal to 24V.

8. The DC-DC converter circuit of claim 6 wherein the control circuit is further configured to generate and provide the reference voltage to the error amplifier.

9. The DC-DC converter circuit of claim 5 wherein the output filter circuit comprises:
  an inductor-capacitor (LC) filter circuit configured to regulate the output voltage to the defined voltage range based on the bias voltage;
  a power-stage switch circuit configured to toggle between the input voltage and a ground to thereby set the bias voltage for the LC filter circuit; and
  a driver-stage circuit configured to toggle the power-stage switch circuit between the input voltage and the ground based on the duty cycle of the pulse train.

10. The DC-DC converter circuit of claim 9 wherein the compensator circuit is further configured to change the control voltage to cause the modulator circuit to change the duty cycle of the pulse train.

11. The DC-DC converter circuit of claim 9 wherein the LC filter circuit comprises the MLCC having the capacitance that is inversely related to the output voltage.

12. The DC-DC converter circuit of claim 11 corresponding to a cutoff frequency that is proportionally related to the configurable transconductance of the error amplifier and inversely related to the capacitance of the MLCC.

13. The DC-DC converter circuit of claim 5 wherein the error amplifier is further configured to:
  increase the control current in response to an increase of a differential between the output voltage and the reference voltage; and
  decrease the control current in response to a decrease of the differential between the output voltage and the reference voltage.

14. A direct-current to direct-current (DC-DC) converter circuit comprising:
  a modulator circuit configured to generate a pulse train based on an input waveform and a control voltage that sets a duty cycle of the pulse train;
  an output filter circuit comprising an inductor-capacitor (LC) filter circuit formed based on an inductor and a multi-layer ceramic capacitor (MLCC), the output filter circuit configured to generate a bias voltage based on an input voltage and the duty cycle of the pulse train to cause a current to flow through the MLCC to thereby generate an output voltage in a defined voltage range;
  a compensator circuit having a configurable transconductance and configured to:
    generate a control current as a function of the configurable transconductance; and
    generate the control voltage based on the control current and provide the control voltage to the modulator circuit to thereby set the duty cycle of the pulse train; and
  a control circuit coupled to the output filter circuit and the compensator circuit and configured to:
    receive an indication of the defined voltage range of the output voltage;
    determine the configurable transconductance based on the defined voltage range of the output voltage; and
    configure the compensator circuit to generate the control voltage current based on the determined configurable transconductance to thereby reduce an instability of the output voltage caused by a capacitance fluctuation of the MLCC as a result of a variation of the bias voltage.

15. The DC-DC converter circuit of claim 14 wherein the control circuit is further configured to:
    decrease the configurable transconductance of the compensator circuit when the capacitance of the MLCC increases; and
    increase the configurable transconductance of the compensator circuit when the capacitance of the MLCC decreases.

16. The DC-DC converter circuit of claim 14 wherein the control circuit is further configured to retrieve the configurable transconductance from a look-up table (LUT) configured to correlate a plurality of configurable transconductances with a plurality of predefined ranges of the output voltage, respectively.

17. The DC-DC converter circuit of claim 14 wherein the compensator circuit comprises:
    an error amplifier having the configurable transconductance and configured to generate the control current based on the indication of the predefined range of the output voltage and a reference voltage representing a scaled target of the output voltage; and
    a circuit configured to generate the control voltage based on the control current and provide the control voltage to the modulator circuit.

18. The DC-DC converter circuit of claim 17 wherein the output filter circuit comprises:
    the LC filter circuit configured to regulate the output voltage to the defined voltage range based on the bias voltage;
    a power-stage switch circuit configured to toggle between the input voltage and a ground to thereby set the bias voltage for the LC filter circuit; and
    a driver-stage circuit configured to toggle the power-stage switch circuit between the input voltage and the ground based on the duty cycle of the pulse train.

19. The DC-DC converter circuit of claim 18 wherein the MLCC a has the capacitance that is inversely related to the output voltage.

20. The DC-DC converter circuit of claim 19 corresponding to a cutoff frequency that is proportionally related to the configurable transconductance of the error amplifier and inversely related to the capacitance of the MLCC.

* * * * *

UNITED STATES PATENT AND TRADEMARK OFFICE
CERTIFICATE OF CORRECTION

PATENT NO. : 12,101,028 B2
APPLICATION NO. : 17/628209
DATED : September 24, 2024
INVENTOR(S) : Thinh Ba Nguyen and Hue Khac Trinh It is certified that error appears in the above-identified patent and that said Letters Patent is hereby corrected as shown below:

In the Specification

In Column 1, at Line 41, replace "LC filler circuit" with --LC filter circuit--

In the Claims

In Column 11, in Claim 4, at Line 31, replace "word a providing" with --word providing--

In Column 12, in Claim 14, at Lines 65-66, replace "the control voltage current" with --the control current--

Signed and Sealed this
Twenty-ninth Day of October, 2024

Katherine Kelly Vidal
*Director of the United States Patent and Trademark Office*